(12) United States Patent
Grant

(10) Patent No.: US 10,769,067 B2
(45) Date of Patent: Sep. 8, 2020

(54) CACHE LINE CONTENTION

(71) Applicant: Arm Limited, Cambridge (GB)

(72) Inventor: Alasdair Grant, Cambridge (GB)

(73) Assignee: Arm Limited, Cambridge (GB)

( * ) Notice: Subject to any disclaimer, the term of this patent is extended or adjusted under 35 U.S.C. 154(b) by 6 days.

(21) Appl. No.: 16/182,669

(22) Filed: Nov. 7, 2018

(65) Prior Publication Data

US 2020/0142831 A1 May 7, 2020

(51) Int. Cl.
*G06F 12/00* (2006.01)
*G06F 12/0815* (2016.01)
*G06F 13/16* (2006.01)
*G06F 13/00* (2006.01)
*G06F 13/28* (2006.01)

(52) U.S. Cl.
CPC ...... *G06F 12/0815* (2013.01); *G06F 13/1668* (2013.01); *G06F 2212/1032* (2013.01); *G06F 2212/608* (2013.01)

(58) Field of Classification Search
CPC ............. G06F 12/0815; G06F 13/1668; G06F 2212/608; G06F 2212/1032
See application file for complete search history.

(56) References Cited

U.S. PATENT DOCUMENTS

| | | | | |
|---|---|---|---|---|
| 5,822,763 A * | 10/1998 | Baylor | ................ | G06F 12/0817 711/141 |
| 6,094,709 A * | 7/2000 | Baylor | ................ | G06F 12/0828 711/118 |
| 6,339,813 B1 * | 1/2002 | Smith et al. | ........ | G06F 12/0859 711/133 |
| 8,140,771 B2 * | 3/2012 | Arimilli | .............. | G06F 12/0822 711/141 |
| 9,292,444 B2 * | 3/2016 | Busaba | ............... | G06F 12/0817 |
| 2007/0186044 A1 * | 8/2007 | Fowles | ..................... | G06F 9/52 711/130 |
| 2010/0088472 A1 * | 4/2010 | Ukai | ................... | G06F 12/0815 711/130 |
| 2010/0191921 A1 * | 7/2010 | Cantin | ................ | G06F 12/0811 711/147 |

(Continued)

*Primary Examiner* — Mark A Giardino, Jr.
(74) *Attorney, Agent, or Firm* — Nixon & Vanderhye P.C.

(57) ABSTRACT

A cache interconnect and method of operating a cache interconnect are disclosed. In the cache interconnect snoop circuitry stores a table containing an entry, for each of a plurality of cache lines, comprising a cache line identifier, an indication of a most recent processing element of a plurality of processing elements associated with the cache interconnect to access the cache line, and an indication of a data item in the cache line which was identified by the most recent processing element to be accessed. In response to a request from a requesting processing element of the plurality of processing elements, the request identifying a requested data item, the snoop circuitry determines a requested cache line identifier corresponding to the requested data item and looks up that identifier in the table. When the requested cache line identifier is stored in an identified entry in the table, the snoop circuitry provides, based on the requested data item and the indication of the data item in the table, an indication as to whether the requested data item is the same as the data item in the identified entry.

15 Claims, 4 Drawing Sheets

(56) References Cited

U.S. PATENT DOCUMENTS

2012/0331233 A1* 12/2012 Cain et al. .......... G06F 12/0815
 711/135
2015/0032973 A1* 1/2015 Liu ..................... G06F 12/0891
 711/144

* cited by examiner

CACHE LINE CONTENTION

TECHNICAL FIELD

The present disclosure relates to the field of data processing. More particularly, it relates to cache line contention in a data processing system.

DESCRIPTION

Cache line contention can be a major source of performance issues in data processing apparatuses. Cache line contention occurs when two or more processing elements repeatedly access the same cache line for write operations. The cache line then "ping-pongs" between the local caches of each of the processing elements. Such contention may be caused by true sharing or false sharing. True sharing occurs when two or more processing elements are accessing the same data item in the same cache line. False sharing occurs when two or more processing elements are accessing different data items in the same cache line. Existing means of detecting contention, such as performance events and memory source tracking, cannot distinguish between true sharing and false sharing.

SUMMARY

In one example embodiment described herein there is an apparatus comprising: a cache interconnect comprising snoop circuitry to store a table containing an entry, for each of a plurality of cache lines, comprising a cache line identifier, an indication of a most recent processing element of a plurality of processing elements associated with the cache interconnect to access the cache line, and an indication of a data item in the cache line which was identified by the most recent processing element to be accessed, wherein the snoop circuitry is responsive to a request from a requesting processing element of the plurality of processing elements, the request identifying a requested data item, to determine a requested cache line identifier corresponding to the requested data item, and wherein the snoop circuitry is responsive to determining that the requested cache line identifier is stored in an identified entry in the table to provide, based on the requested data item and the indication of the data item in the table, an indication as to whether the requested data item is the same as the data item in the identified entry.

Also described herein there is a method of operating a cache interconnect comprising: storing, in snoop circuitry of the cache interconnect, a table containing an entry, for each of a plurality of cache lines, comprising a cache line identifier, an indication of a most recent processing element of a plurality of processing elements associated with the cache interconnect to access the cache line, and an indication of a data item in the cache line which was identified by the most recent processing element to be accessed; receiving, by the snoop circuitry, a request from a requesting processing element of the plurality of processing elements, the request identifying a requested data item; determining, by the snoop circuitry, a requested cache line identifier corresponding to the requested data item; providing, by the snoop circuitry and responsive to determining that the requested cache line identifier is stored in an identified entry in the table, and based on the requested data item and the indication of the data item in the table, an indication as to whether the requested data item is the same as the data item in the identified entry.

Also described herein there is an apparatus comprising: means for storing a table containing an entry, for each of a plurality of cache lines, comprising a cache line identifier, an indication of a most recent processing element of a plurality of processing elements associated with a cache interconnect to access the cache line, and an indication of a data item in the cache line which was identified by the most recent processing element to be accessed; means for receiving a request from a requesting processing element of the plurality of processing elements, the request identifying a requested data item to be accessed; means for determining a requested cache line identifier corresponding to the requested data item; means for providing, responsive to determining that the requested cache line identifier is stored in an identified entry in the table, and based on the requested data item and the indication of the data item in the table, an indication as to whether the requested data item is the same as the data item in the identified entry.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
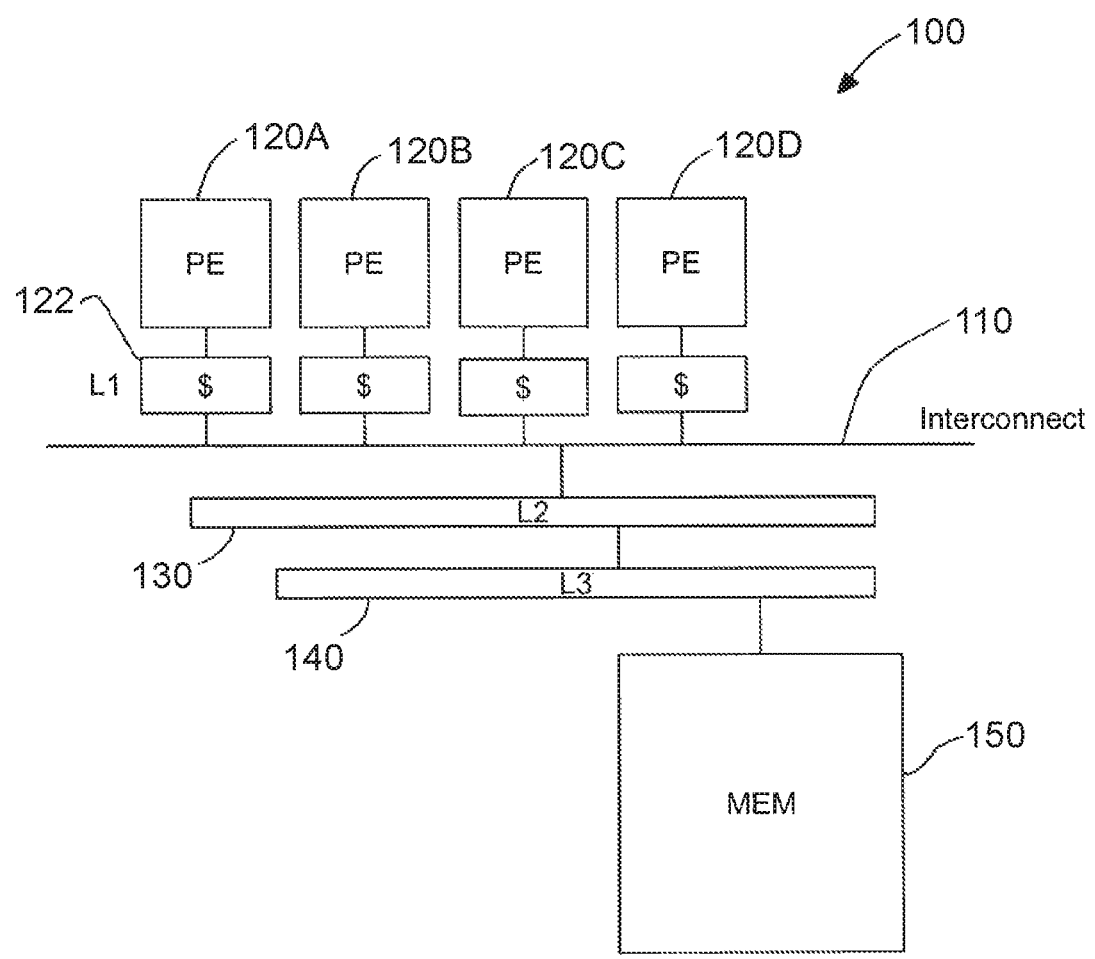
FIG. 1 schematically illustrates an example of an apparatus comprising multiple processing elements connected via a cache interconnect in one embodiment.

Before discussing the embodiments with reference to the accompanying figures, the following description of embodiments is provided.

In accordance with one example configuration there is provided an apparatus comprising: a cache interconnect comprising snoop circuitry to store a table containing an entry, for each of a plurality of cache lines, comprising a cache line identifier, an indication of a most recent processing element of a plurality of processing elements associated with the cache interconnect to access the cache line, and an indication of a data item in the cache line which was specified by the most recent processing element, wherein the snoop circuitry is responsive to a request from a requesting processing element of the plurality of processing elements, the request identifying a requested data item, to determine a requested cache line identifier corresponding to the requested data item, and wherein the snoop circuitry is responsive to determining that the requested cache line identifier is stored in an identified entry in the table to provide, based on the requested data item and the indication of the data item in the table, an identity indication as to whether the requested data item is the same as the data item in the identified entry.

The present techniques recognise that true sharing is independent of the cache granule size, i.e. the smallest accessible data item within a cache line, since it is the same granule (data item) of the cache line which is being accessed by the processing elements. Conversely false sharing is an artefact of the cache line being granular, and the frequency of false sharing is affected by factors such as alignment and granule size. Since the causes of true sharing and false sharing are different, they have different mitigation strategies, and the present techniques provides a mechanism for detecting cache line contention and for detecting whether the cache line contention has been caused by true sharing or false sharing.

The table stored by the snoop circuitry provides a reference database of which cache lines have been accessed by which processing elements and, in particular, which data item was specified by the processing element. For example the processing elements may specify a particular data item to be accessed. This allows the snoop circuitry to determine, for subsequent requests, not only whether there is cache line contention based on whether an entry for the cache line containing the requested data item exists—most recently accessed by a different processing element—but also whether the requested data item is the same as the data item in the identified entry, and therefore whether true sharing or false sharing is occurring.

In some example configurations the snoop circuitry further comprises a true sharing counter, and the snoop circuitry is responsive to the identity indication showing that the requested data item is the same as the data item in the entry for the requested cache line to increment a value held by the true sharing counter. This provides a means of determining how frequently true sharing occurs, based on the value held by the true sharing counter, since the true sharing counter is incremented each time true sharing is detected by the snoop circuitry.

In some example configurations the value held by the true sharing counter is stored in a software readable storage location. This allows the value held by the true sharing counter to be accessed by other software and used for various purposes such as performance monitoring and statistics collection.

In some example configurations the snoop circuitry further comprises a false sharing counter, and the snoop circuitry is responsive to the identity indication showing that the requested data item is not the same as the data item in the entry for the requested cache line to increment a value held by the false sharing counter. This provides a means of determining how frequently false sharing occurs, based on the value held by the false sharing counter, since the false sharing counter is incremented each time false sharing is detected by the snoop circuitry.

In some example configurations the value held by the false sharing counter is stored in a software readable storage location. This allows the value held by the false sharing counter to be accessed by other software and used for various purposes such as performance monitoring and statistics collection.

In some example configurations the data item in the cache line is a first accessed data item which was specified by the most recent processing element to be accessed first amongst plural data items in the cache line. The most recent processing element may thus have specified a particular data item to be accessed first amongst plural data items in the cache line when a "critical word first" approach to line fill operations in a cache is supported by the system (i.e. the ability to prioritise, and access first, a given data item in a cache line, regardless of where that given data item lies in the cache line). The snoop circuitry can thus exploits this signalling to determine which data item was being accessed by the most recent processing element.

In some example configurations the requested data item is specified in the request to be accessed first amongst plural data items in the cache line by the requesting processing element. As in the above example, the snoop circuitry can thus exploit the signalling associated with a "critical word first" line fill operation triggered by the requesting processing element to track which data item is being accessed in order to determine whether when true sharing or false sharing occurs.

In some example configurations the identity indication is provided to the requesting processing element with the requested data item. In other words, the requesting processing element is not only made aware of the fact that there is contention, but also whether the requested data item is currently being accessed by another processing element (i.e. whether there is true sharing or false sharing taking place).

In some example configurations the snoop circuitry is configured to update the identified entry in the table such that the indication of the most recent processing element of the plurality of processing elements to access the cache line corresponds to the requesting processing element, and the indication of the data item in the cache line which was identified by the most recent processing element to be accessed corresponds to the requested data item. Accordingly the table can be updated on an ongoing basis each time a request to access a data item is processed, thereby ensuring that the table is up-to-date for each subsequent request that is received and that the indication provided by the snoop circuitry (i.e. whether true or false sharing is occurring) reflects the current state of the apparatus.

In some example configurations the request identifying a requested data item comprises a memory address of the requested data item.

In some example configurations the cache interconnect is configured to provide a status indicator to the requesting processing element with the requested data item. This provides a means of reporting to the requesting processing element the status of the requested data item.

In some example configurations the status indicator comprises: an indication that the data item is not being shared when the requested cache line identifier is not stored in the entries in the table. This provides confirmation to the requesting processing element that there is not contention associated with the cache line containing the requested data item.

In some example configurations the status indicator comprises: an indication that true sharing of the requested data item is occurring when the requested data item is the same as the data item in the entry for the requested cache line. This provides a means of indicating to the requesting processing element that true sharing is occurring, in other words that another processing element is also accessing the cache line and the same requested data item.

In some example configurations the status indicator comprises: an indication that false sharing of the requested data item is occurring when the requested data item is not the same as the data item in the entry for the requested cache line. This provides a means of indicating to the requesting processing element that false sharing is occurring, in other words that another processing element is also accessing the same cache line, but that the other processing element is accessing a different data item in the cache line.

In another example configuration there is provided a method of operating a cache interconnect comprising: storing, in snoop circuitry of the cache interconnect, a table containing an entry, for each of a plurality of cache lines, comprising a cache line identifier, an indication of a most recent processing element of a plurality of processing elements associated with the cache interconnect to access the cache line, and an indication of a data item in the cache line which was specified by the most recent processing element;

receiving, by the snoop circuitry, a request from a requesting processing element of the plurality of processing elements, the request identifying a requested data item; determining, by the snoop circuitry, a requested cache line identifier corresponding to the requested data item; providing, by the snoop circuitry and responsive to determining that the requested cache line identifier is stored in an identified entry in the table, and based on the requested data item and the indication of the data item in the table, an identity indication as to whether the requested data item is the same as the data item in the identified entry.

In another example configuration there is provided an apparatus comprising: means for storing a table containing an entry, for each of a plurality of cache lines, comprising a cache line identifier, an indication of a most recent processing element of a plurality of processing elements associated with a cache interconnect to access the cache line, and an indication of a data item in the cache line which was specified by the most recent processing element; means for receiving a request from a requesting processing element of the plurality of processing elements, the request identifying a requested data item to be accessed; means for determining a requested cache line identifier corresponding to the requested data item; means for providing, responsive to determining that the requested cache line identifier is stored in an identified entry in the table, and based on the requested data item and the indication of the data item in the table, an identity indication as to whether the requested data item is the same as the data item in the identified entry.

Particular embodiments will now be described with reference to the figures.

FIG. 1 illustrates an example of an apparatus 100 comprising a cache interconnect 110. Associated with the cache interconnect 110 are a plurality of processing elements 120. Although four processing elements 120A-D are illustrated in FIG. 1, it will be appreciated that there may be fewer, for example 2, or more, for example 8. Further, although representations of the processing elements 120 in FIG. 1 are identical it should be appreciated that each processing element 120 may be differently configured. Each processing element 120 has a local cache 122 (L1) for storing cache lines which are accessed when data processing operations are performed by the respective processing element 120. The cache interconnect 110 connects the processing elements 120 to a shared level 2 cache 130 (L2), a shared level 3 cache 140 (L3) and the main memory 140, in a hierarchical structure with which one of ordinary skill in the art will be familiar. Although two levels of shared cache are illustrated in FIG. 1, it will be appreciated that this is not essential and fewer levels of shared cache (e.g. only L2) or more levels of shared cache (e.g. L2-L4) are also be possible. The cache interconnect 110 also manages the coherency of data items cached across multiple caches in the apparatus by monitoring transactions between the processing elements 120 and the caches. This monitoring of transactions is performed by snoop circuitry, and is described in more detail with respect of FIG. 2.

Figure 2:
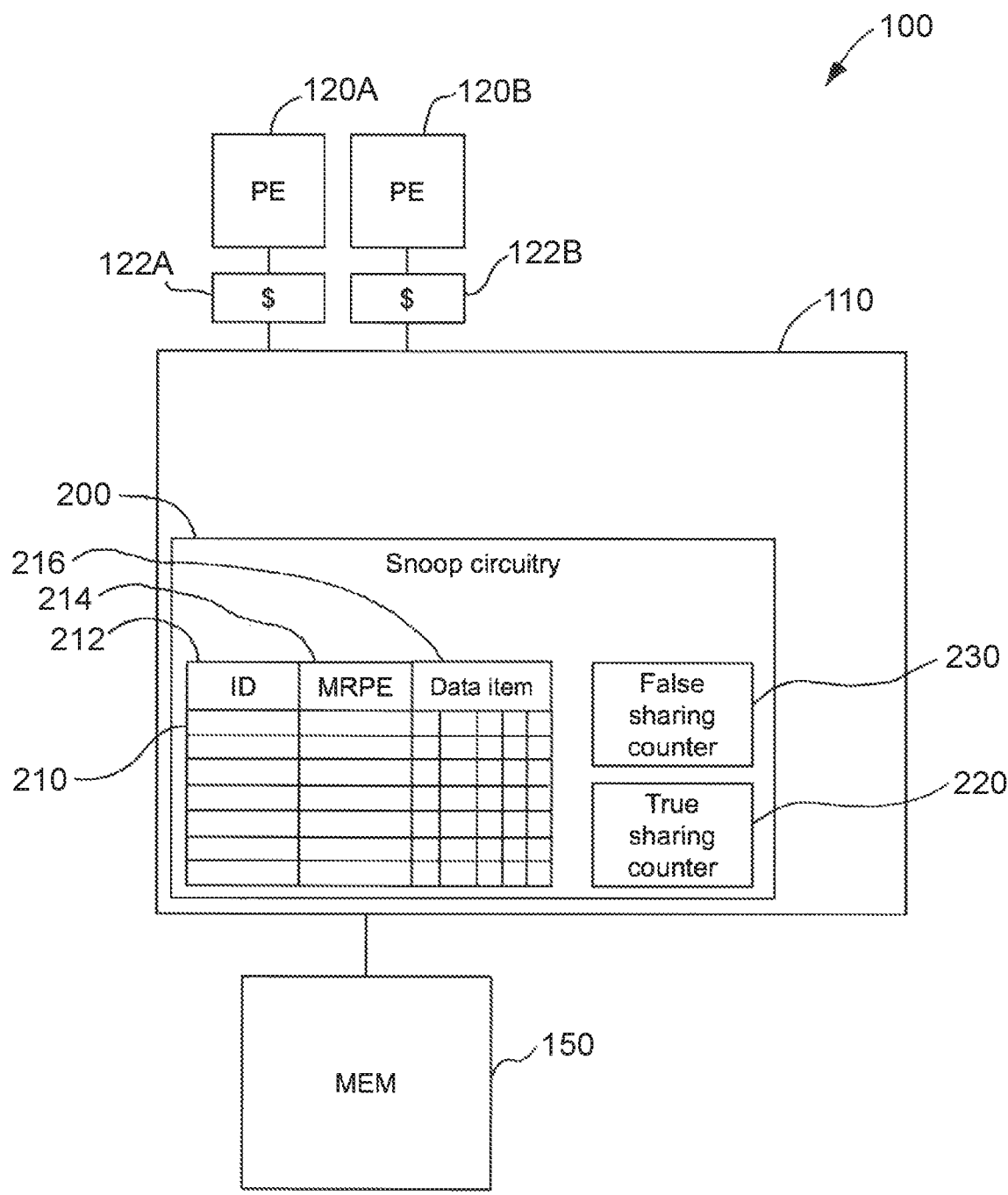
FIG. 2 schematically illustrates an embodiment of the apparatus illustrated in FIG. 1 in further detail.

FIG. 2 schematically illustrates the apparatus 100 illustrated in FIG. 1, where the same reference signs are used to denote the same features, but showing some features of the cache interconnect 110 in further detail. In particular, the cache interconnect 110 in FIG. 2 comprises snoop circuitry 200 which stores a table 210. The table contains an entry for each of a plurality of cache lines. Each entry in the table 210 comprises a cache line identifier (ID) 212, an indication 214 of a most recent processing element (MRPE) 120A to access the cache line, and an indication 216 of a data item in the cache line which was specified by the most recent processing element 120A. For example the most recent processing element may have issued a write access request for a specified data item identified by its memory address.

In some cases the data item in the cache line is a first accessed data item which was identified by the most recent processing element 120A to be accessed first amongst plural data items in the cache line. Further the cache hierarchy may support a "critical word first" approach, according to which when a cache miss occurs a critical word first line fill operation is carried out to receive the cache line, prioritising the retrieval of the specified "critical word" first. Where this critical word first involves the specification of a particular, prioritised, word in the cache line, the snoop circuitry can observe that specification to determine the data item in the cache line for the purposes of checking and/or updating its table 210.

The snoop circuitry 200 monitors such requests issued by requesting processing elements 120 to access particular data items. Each request identifies a requested data item that the requesting processing element 120 is to access. As described above, in some cases the requested data item is specified in the request to be accessed first amongst plural data items in the cache line by the requesting processing element 120. On a cache miss the cache may use a critical word first line fill operation to retrieve the cache line from a higher level of cache (or from memory).

Assume in the example illustrated in FIG. 2 that processing element 120B sends an access request for a particular data item on the interconnect, which is observed by the snoop circuitry 200. In response observing such a request, the snoop circuitry 200 determines a requested cache line identifier corresponding to the requested data item. This cache line identifier is essentially an indication of a section of memory, corresponding to a defined cache line size in the system, which comprises the data item. The snoop circuitry 200 then determines whether the requested cache line identifier is stored in a currently valid entry of the table 210, for example using a look-up or query operation. If the requested cache line identifier is not stored in an entry in the table 210, this means that the cache line containing the requested data item is not currently validly held in the cache of another processing element 120A and therefore that there is no contention for that particular cache line. Conversely, if the requested cache line identifier is stored in an currently valid entry in the table 210, this indicates that the cache line is currently validly held in the cache of another processing element 120A and therefore that there is contention for that particular cache line.

In response to determining that the requested cache line identifier is stored in an identified entry in the table 210, the snoop circuitry 200 provides, based on the requested data item and the indication of the data item in the table 210, an indication as to whether the requested data item is the same as the data item in the identified entry. In other words an indication is provided by the snoop circuitry 200 when it is determined that there is contention associated with the requested data item. If the requested data item is the same as the data item in the identified entry, this means that the requesting processing element 120B and the most recent processing element 120A have requested the same data item and therefore true sharing has occurred. In contrast, if the requested data item is not the same as the data item in the identified entry, this means that the requesting processing element 120B and the most recent processing element 120A require the same cache line but have requested different data items, and therefore false sharing has occurred. The indication provided by the snoop circuitry 200 provides a means of distinguishing between true sharing and false sharing. In some cases the indication is provided to the requesting processing element 120B with the requested data item when it is returned. By receiving the indication the requesting processing element 120B is informed that there is contention for the cache line that it is accessing, and the value or content of the indication indicates whether the contention is true sharing or false sharing.

In some cases the snoop circuitry 200 is configured to update the identified entry in the table 210, for example as part of responding to an observed request from a processing element 120 for a data item as described above. This means that the indication of the most recent processing element 120A to access the cache line is updated to correspond to the requesting processing element 120B. The indication of the data item in the cache line which was identified by the most recent processing element to be accessed is also updated to correspond to the requested data item. If it was determined that the identifier for the requested cache line was not stored an entry in the table 210, the table 210 is also updated to create an entry for that cache line. In other words, the table 210 is updated each time a cache line is requested by a processing element 120 in order to indicate that the cache line is now being accessed by a processing element 120. The table itself may be administered in the manner of cache storage, with entries being allocated when required and older (possibly marked as invalid) entries being victimised to provide the required new entry storage.

The snoop circuitry 200 illustrated in FIG. 2 also comprises a true sharing counter 220. The snoop circuitry 200 is responsive to the indication that the requested data item is the same as the data item in the entry for the requested cache line to increment a value held by the true sharing counter 220. In other words, when the snoop circuitry 200 determines that true sharing is occurring, the value held by the true sharing counter 220 is incremented. The increment may be a single unit, or may be multiple units, according to implementation requirements. The snoop circuitry 200 also comprises a false sharing counter 230. The snoop circuitry 200 is responsive to the indication that the requested data item is not the same as the data item in the entry for the requested cache line to increment a value held by the false sharing counter 230. In other words, when the snoop circuitry 200 determines that false sharing is occurring, the value held by the false sharing counter 230 is incremented. As with the true sharing counter, the increment may be a single unit, or may be multiple units, as required. In some cases the value held by the true sharing counter 220 and/or the value held by the false sharing counter 230 is stored in a software readable storage location. In other words, processing elements 120 executing software are able to access the value held by the true sharing counter 220 and/or the false sharing counter 230 for use in the software, such as an input for an operation, statistical profiling or to trigger an event or action at the processing element 120 running the software. For example, software may periodically sample each counter and an event may be triggered when the value held by the true sharing counter 220 and/or the false sharing counter 230 is incremented above a predetermined threshold.

In some cases the cache interconnect 110 is configured to provide a status indicator to the requesting processing element 120 with the requested data item. The status indicator can relate to whether there is contention for the requested data item. In other words if there is no contention for the requested data item, the status indicator can comprise an indication that the data item is not being shared when the requested cache line identifier is not stored the entries in the table 210. If there is contention for the requested data item, the status indicator can comprise an indication that true sharing of the requested data item is occurring when the requested data item is the same as the data item in the entry for the requested cache line, and the status indicator can comprise an indication that false sharing of the requested data item is occurring when the requested data item is not the same as the data item in the entry for the requested cache line.

Figure 3:
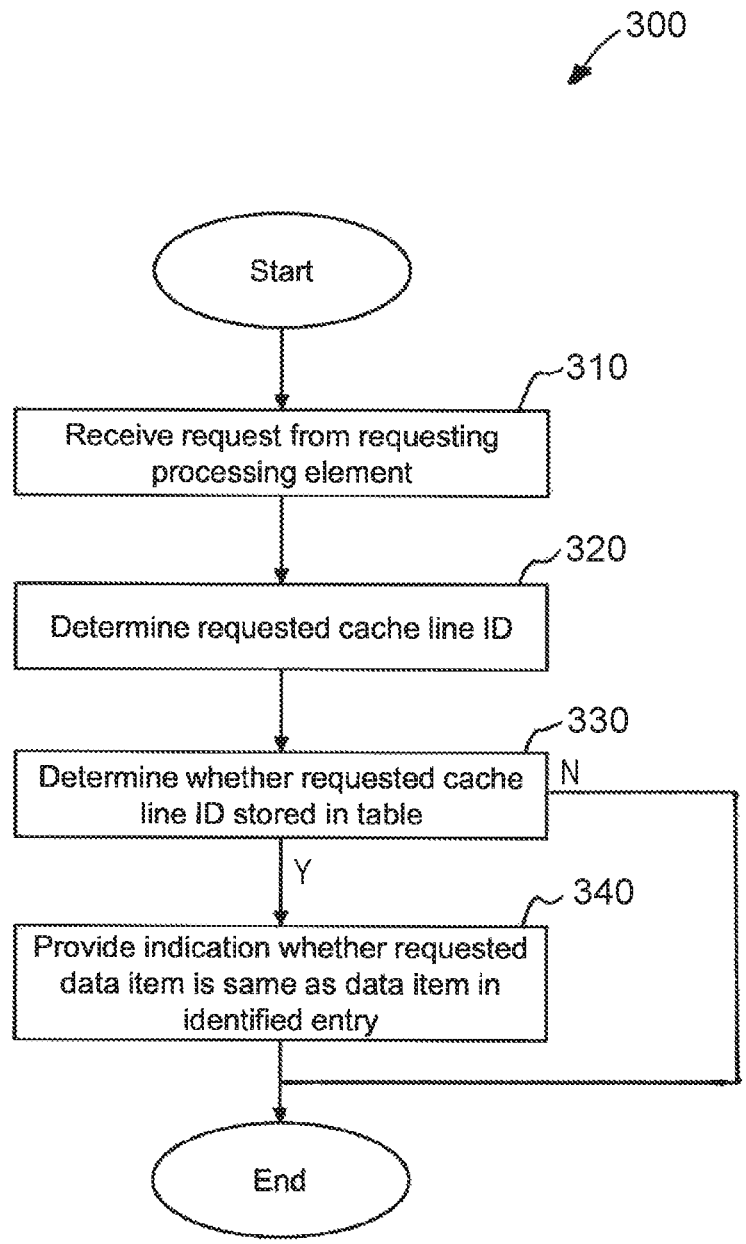
FIG. 3 is a flow diagram showing a method of operating a cache interconnect in one embodiment.

FIG. 3 is a flow diagram showing a method 300 of operating a cache interconnect. The snoop circuitry of the cache interconnect stores a table containing an entry for each of a plurality of cache lines. Each entry comprises a cache line identifier, an indication of a most recent processing element to access the cache line, and an indication of a data item in the cache line which was identified by the most recent processing element to be accessed. The method begins at step 310, where a request is received by the snoop circuitry from a requesting processing element. The request identifies a requested data item. At step 320 the snoop circuitry determines a requested cache line identifier (cache line ID) corresponding to the requested data item. At step 330 the snoop circuitry determines whether the requested cache line ID is stored in the table. If the requested cache line ID is stored in the table, the method continues to step 340, where the snoop circuitry provides an indication as to whether the requested data item is the same as the data item in the identified entry. If the requested cache line ID is not stored in the table, the method ends. It will be appreciated that the snoop circuitry may receive further requests whilst processing one request. Accordingly, although the method illustrated in FIG. 3 is performed for each request, multiple instances may occur at least particularly simultaneously as different requests are processed. For example step 310 may be performed for one request whilst step 330 or 340 is being performed for another request.

Figure 4:
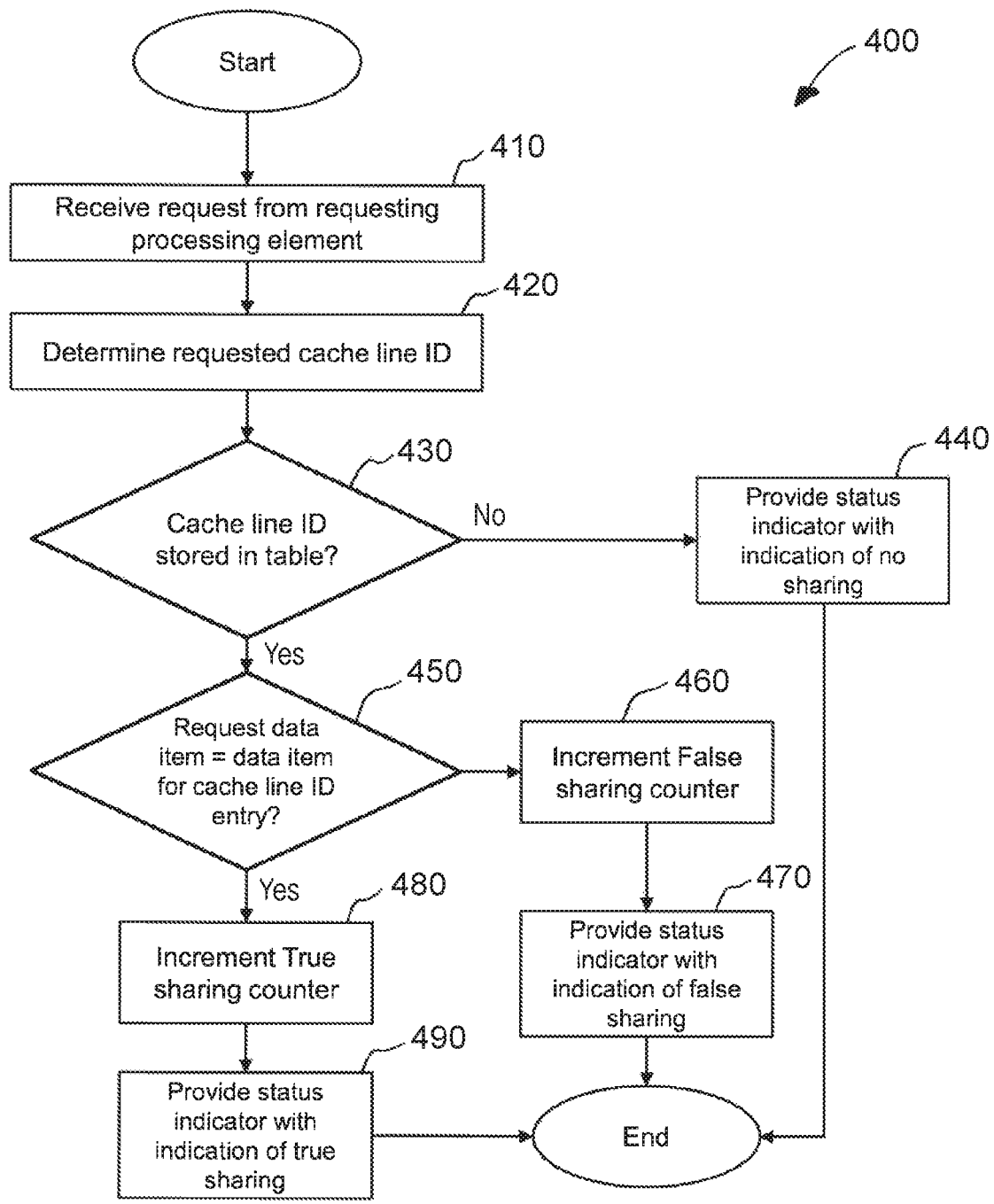
FIG. 4 is a flow diagram showing a further method of operating a cache interconnect in one embodiment.

FIG. 4 is a flow diagram showing a further method 400 of operating a cache interconnect. This example method is set out here in the context of the snoop circuitry 200 of the cache interconnect 110 described above, although it will be recognised that the method can also be carried out on other configurations of a cache interconnect. Nevertheless in this example the snoop circuitry 200 of the cache interconnect 110 stores a table 210 containing an entry for each of a plurality of cache lines. Each entry comprises a cache line identifier, an indication of a most recent processing element 120A to access the cache line, and an indication of a data item in the cache line which was identified by the most recent processing element 120A to be accessed. The method begins at step 410, where a request is received by the snoop circuitry 200 from a requesting processing element 120B. The request identifies a requested data item. At step 420 the snoop circuitry 200 determines a requested cache line identifier (cache line ID) corresponding to the requested data item. At step 430 it is determined whether the cache line ID is stored in the table 210. If it is not, the method continues to step 440, where the snoop circuitry 200 provides a status indictor to the requesting processing element 120B (which may for example be returned with the requested data item). In this case, the status indicator comprises an indication that the data item is not being shared, since the requested cache line identifier is not stored the entries in the table 210, and therefore that there is no contention. The method then ends.

If at step 430 it is determined that the cache line ID is stored in the table 210, the method continues to step 450, where it is determined whether the requested data item is the same as the data item in the entry for the requested cache line. If the requested data item is not the same as the data item in the entry for the requested cache line, the method continues to step 460, where the value held by the false sharing counter 230 is incremented. The method then continues to step 470, where the snoop circuitry 200 provides a status indictor to the requesting processing element 120B (which may for example be returned with the requested data item). In this case, the status indicator comprises an indication that false sharing of the requested data item is occurring, since the requested data item is not the same as the data item in the entry for the requested cache line. The method then ends. If at step 450 it is determined that the requested data item is the same as the data item in the entry for the requested cache line, the method continues to step 480, where the value held by the true sharing counter 220 is incremented. The method then continues to step 490, where the snoop circuitry 200 provides a status indictor to the requesting processing element 120B (which may for example be returned with the requested data item). In this case, the status indicator comprises an indication that true sharing of the requested data item is occurring, since the requested data item is the same as the data item in the entry for the requested cache line. The method then ends. As with the method illustrated in FIG. 3, although the method illustrated in FIG. 4 is performed for each request, multiple instances may occur at least particularly simultaneously as different requests are processed. For example step 410 may be performed for one request whilst step 440, 460 or 480 is being performed for another request.

In brief overall summary a cache interconnect and method of operating a cache interconnect are disclosed. In the cache interconnect snoop circuitry stores a table containing an entry, for each of a plurality of cache lines, comprising a cache line identifier, an indication of a most recent processing element of a plurality of processing elements associated with the cache interconnect to access the cache line, and an indication of a data item in the cache line which was identified by the most recent processing element to be accessed. In response to a request from a requesting processing element of the plurality of processing elements, the request identifying a requested data item, the snoop circuitry determines a requested cache line identifier corresponding to the requested data item and looks up that identifier in the table. When the requested cache line identifier is stored in an identified entry in the table, the snoop circuitry provides, based on the requested data item and the indication of the data item in the table, an indication as to whether the requested data item is the same as the data item in the identified entry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. An apparatus comprising:
a cache interconnect comprising snoop circuitry to store a table containing an entry, for each of a plurality of cache lines, comprising a cache line identifier, an indication of a most recent processing element of a plurality of processing elements associated with the cache interconnect to access the cache line, and an indication of a data item in the cache line which was identified by the most recent processing element to be accessed;
wherein the snoop circuitry is responsive to a request from a requesting processing element of the plurality of processing elements, the request identifying a requested data item, to determine a requested cache line identifier corresponding to the requested data item, and
wherein the snoop circuitry is responsive to determining that the requested cache line identifier is stored in an identified entry in the table to provide, based on the requested data item and the indication of the data item in the table, an identity indication as to whether the requested data item is the same as the data item in the identified entry,
wherein the snoop circuitry further comprises a false sharing counter, and the snoop circuitry is responsive to the identity indication showing that the requested data item is not the same as the data item in the entry for the requested cache line to increment a value held by the false sharing counter.

2. The apparatus of claim 1, wherein the snoop circuitry further comprises a true sharing counter, and the snoop circuitry is responsive to the identity indication showing that the requested data item is the same as the data item in the entry for the requested cache line to increment a value held by the true sharing counter.

3. The apparatus of claim 2, wherein the value held by the true sharing counter is stored in a software readable storage location.

4. The apparatus of claim 1, wherein the value held by the false sharing counter is stored in a software readable storage location.

5. The apparatus of claim 1, wherein the data item in the cache line is a first accessed data item which was identified by the most recent processing element to be accessed first amongst plural data items in the cache line.

6. The apparatus of claim 1, wherein the requested data item is specified in the request to be accessed first amongst plural data items in the cache line by the requesting processing element.

7. The apparatus of claim 1, wherein the identity indication is provided to the requesting processing element with the requested data item.

8. The apparatus of claim 1, wherein the snoop circuitry is configured to update the identified entry in the table such that the indication of the most recent processing element of the plurality of processing elements to access the cache line corresponds to the requesting processing element, and the indication of the data item in the cache line which was identified by the most recent processing element to be accessed corresponds to the requested data item.

9. The apparatus of claim 1, wherein the request identifying a requested data item comprises a memory address of the requested data item.

10. The apparatus of claim 1, wherein the cache interconnect is configured to provide a status indicator to the requesting processing element with the requested data item.

11. The apparatus of claim 10, wherein the status indicator comprises:
an indication that the data item is not being shared when the requested cache line identifier is not stored in the entries in the table.

12. The apparatus of claim 10, wherein the status indicator comprises:
an indication that true sharing of the requested data item is occurring when the requested data item is the same as the data item in the entry for the requested cache line.

13. The apparatus of claim 10, wherein the status indicator comprises:
an indication that false sharing of the requested data item is occurring when the requested data item is not the same as the data item in the entry for the requested cache line.

14. A method of operating a cache interconnect comprising:
storing, in snoop circuitry of the cache interconnect, a table containing an entry, for each of a plurality of cache lines, comprising a cache line identifier, an indication of a most recent processing element of a plurality of processing elements associated with the cache interconnect to access the cache line, and an indication of a data item in the cache line which was identified by the most recent processing element to be accessed;
receiving, by the snoop circuitry, a request from a requesting processing element of the plurality of processing elements, the request identifying a requested data item;
determining, by the snoop circuitry, a requested cache line identifier corresponding to the requested data item;
providing, by the snoop circuitry and responsive to determining that the requested cache line identifier is stored in an identified entry in the table, and based on the requested data item and the indication of the data item in the table, an identity indication as to whether the requested data item is the same as the data item in the identified entry; and
in response to the identity indication showing that the requested data item is not the same as the data item in the entry for the requested cache line, incrementing a value held by a false sharing counter.

15. An apparatus comprising:
means for storing a table containing an entry, for each of a plurality of cache lines, comprising a cache line identifier, an indication of a most recent processing element of a plurality of processing elements associated with a cache interconnect to access the cache line, and an indication of a data item in the cache line which was identified by the most recent processing element to be accessed;
means for receiving a request from a requesting processing element of the plurality of processing elements, the request identifying a requested data item to be accessed;
means for determining a requested cache line identifier corresponding to the requested data item;
means for providing, responsive to determining that the requested cache line identifier is stored in an identified entry in the table, and based on the requested data item and the indication of the data item in the table, an identity indication as to whether the requested data item is the same as the data item in the identified entry; and
responsive to the identity indication showing that the requested data item is not the same as the data item in the entry for the requested cache line, means for incrementing a value held by a false sharing counter.

* * * * *